R. T. SUTTON.
Grain Drier.
No. 51,880. Patented Jan'y 2, 1866.
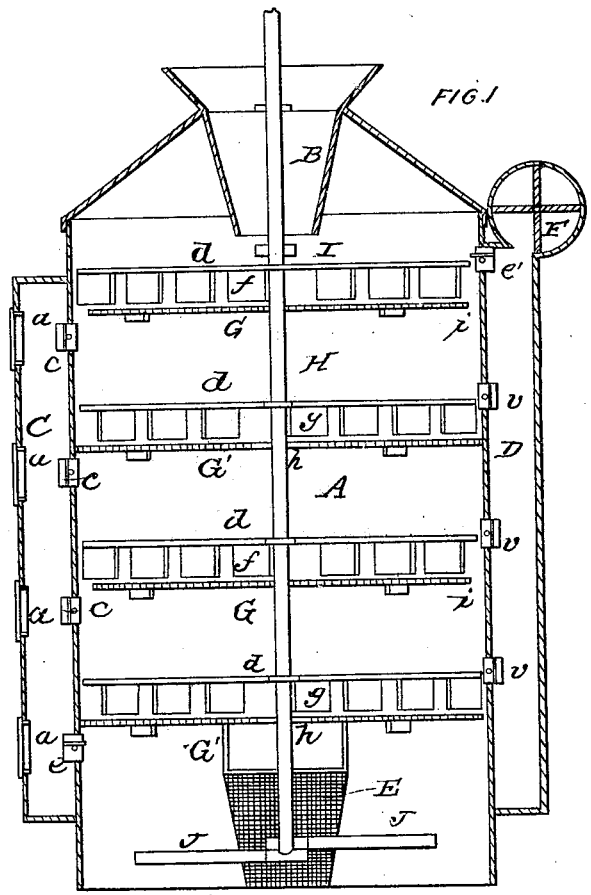
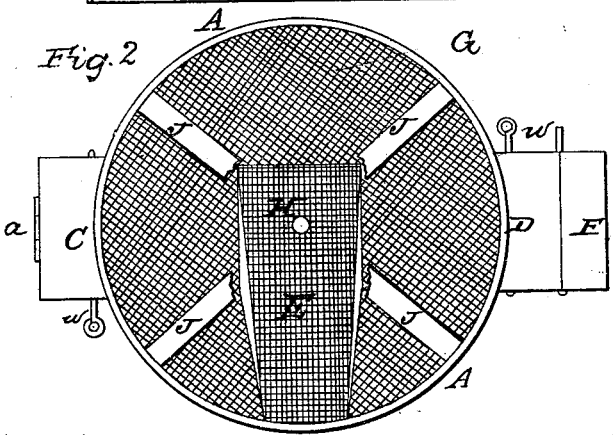
WITNESSES
INVENTOR

UNITED STATES PATENT OFFICE.

R. T. SUTTON, OF ROCHESTER, NEW YORK.

GRAIN-DRIER.

Specification forming part of Letters Patent No. 51,880, dated January 2, 1866

*To all whom it may concern:*

Be it known that I, R. T. SUTTON, of Rochester, in the county of Monroe and State of New York, have invented certain new and useful Improvements in Grain Driers and Coolers; and I do hereby declare that the following is a full, clear, and exact description thereof, reference being had to the accompanying drawings, making part of this specification, in which—

Figure 1 is a vertical central section of my invention. Fig. 2 is an inverted view of the same, the step-bars J being broken away in the center, which exposes the end of the driving-shaft H.

Similar letters of reference indicate corresponding parts in both figures.

This invention consists in the employment of two or more sets of conveyers, one set being right handed and the next left—or, in other words, centrifugal and centripetal—to be used in combination with perforated floors, arranged within a suitable tower or case, whereby the grain deposited upon the center of the upper floor is gradually spread over its surface and finally discharged from the circumference to the next floor below, where it is again spread, and is conveyed back to the center and discharged upon the next floor, and so on over the several floors in the tower.

To enable others to make and use my invention, I will describe its construction and operation.

A in the drawings represents a case or tower made of wood, brick, or other suitable material, and provided at the top with a hopper, B. It is divided into several stories by finely-perforated or other metallic floors G and G', and has a vertical shaft, H, reaching from top to bottom, or nearly so. To this shaft is attached several arms, $d$, and to these are fixed the conveyers $f$ and $g$, which sweep over and near the floors when the shaft revolves.

The grain flowing in through the hopper B and deposited upon the center of the upper floor is spread, by the action of the conveyers $f$, over the entire surface of that floor before being discharged from the outer edge to the next, where it is received and again operated upon by the conveyers $g$, and as their action is centripetal the grain is thereby returned to the center and discharged upon the next floor through the aperture $h$, as upon the first, and so on until it is discharged from the lower floor into the chute E, which is also made of perforated metal.

The chambers C and D are arranged on opposite sides of the tower, with which they may, either or both of them, be made to communicate by opening the valves $c$ and $v$, as shown by the valves $e$ and $e'$. The arrangement, operation, and effect of these valves, the ventilators $a$, and fan F, is the same as of those in my former patent of March 15, 1864, and also, as in that case, the hot or cold air may be introduced at the bottom of the tower and allowed to pass up through the perforated floors and the grain, and discharged from the top; but by this plan the grain cannot be desiccated and cooled during the same operation.

The great advantage of using the centrifugal conveyers $f$, instead of the cones, as formerly, with the centripetal ones, is that the grain may be moved over much more drying or cooling surface, as the case may be, in a given height of the tower, and thereby more thoroughly desiccated and prepared for storage or shipping.

What I claim as my invention, and desire to secure by Letters Patent, is—

The said conveyers and metallic floors, in combination with the fan F, valves $c$ and $v$, and the ventilators $a$, as and for the purposes set forth.

R. T. SUTTON.

Witnesses:
WM. S. LOUGHBOROUGH,
ASA H. BILLINGS.